United States Patent [19]

Stark et al.

[11] 3,916,310

[45] Oct. 28, 1975

[54] ELECTRONIC MEASURING INSTRUMENT ARRANGEMENT FOR MEASURING ELECTRICAL A-C QUANTITIES

[75] Inventors: Reinhard Stark, Nurnberg; Manfred Schwendtner, Schwarzenbruck; Günter Steinmüller, Nurnberg, Germany

[73] Assignee: Siemens Aktiengesellschaft, Munich, Germany

[22] Filed: May 28, 1974

[21] Appl. No.: 473,700

[30] Foreign Application Priority Data
June 5, 1973  Germany............................. 2328587
June 13, 1973  Germany............................. 2330048

[52] U.S. Cl. .................. 324/127; 323/6; 323/48
[51] Int. Cl.² ................... G01R 1/20; G01R 19/00
[58] Field of Search.. 324/117 R, 127, 99 R, 123 R, 324/123 C; 323/6, 48

[56] References Cited
UNITED STATES PATENTS
2,889,519   6/1959   Montgomery et al. ............. 324/127

*Primary Examiner*—Alfred E. Smith
*Assistant Examiner*—Ernest F. Karlsen
*Attorney, Agent, or Firm*—Kenyon & Kenyon Reilly Carr & Chapin

[57] ABSTRACT

An arrangement for measuring electrical alternating current quantities using an electronic measuring instrument in which the alternating current quantities to be measured are isolated from the electronic components of the measuring instrument in such a way that the errors introduced by such isolation are eliminated by using a current comparator at the input to the measuring instrument.

6 Claims, 5 Drawing Figures

ELECTRONIC MEASURING INSTRUMENT ARRANGEMENT FOR MEASURING ELECTRICAL A-C QUANTITIES

BACKGROUND OF THE INVENTION

This invention relates to the measurement of alternating current electrical quantities in general, and more particularly to an improved arrangement for measuring such quantities where the measuring instrument must be isolated from the quantity being measured.

It is normally necessary that electronic instruments used for the measurement of alternating current quantities such as voltage current power and work or energy be separated or isolated from the quantities being measured. This isolation which is normally done through the use of some sort or transformer introduces measuring errors which can normally be reduced to low amounts only through the use of extremely expensive components. Typical instruments or isolation devices used for making such measurements particularly where large A-C quantities are involved, comprise current and voltage transformers which provide a stepped down voltage and isolation between the circuit being measured and the measuring instrument. In order to avoid large measured errors, it is necessary that expensive current transformers be used.

In view of this, it can be seen that there is a need for an improved measuring arrangement in which low cost current transformers and the like may be used and which still provide the required accuracy.

SUMMARY OF INVENTION

The present invention provides such an arrangement. It permits making measurements using low cost current transformers without sacrificing accuracy. Essentially the basis of the present invention resides in the use of current comparators to obtain the necessary isolation rather than simply the use of transformers. In the preferred embodiment, the current comparator or comparators are connected directly or indirectly through interposed switching elements to an operational amplifier associated with the measuring instrument. Through this arrangement, measuring accuracy can be increased to almost any desired level. The arrangement of the present invention is particularly useful when measuring electrical energy using the time division principle as disclosed in German Pat. No. 1,807,581. In the arrangement disclosed therein, the secondary coil of a current transformer is connected directly to the input of an operational amplifier through a switch in order to form a signal proportional to current. The direct connection of the current transformers secondary coil supposedly reduces the drift influences of the instruments operational amplifier and the residual resistance of succeeding electronic switching elements. In order to stay within a specified maximum magnitude and angular error, it is necessary in this arrangement that a relatively high cost current transformer be employed. With the method of the present invention, it is possible to reduce this cost considerably using instead a simple cheap current transformer equipped with electronic error compensation according to the present invention. In the disclosed embodiment, a current transformer with a ferrite cup core is used. Ferrite cup cores of this nature are commercially available items and can have windings applied thereto in a simple manner. They can be wound in a practical manner as simple coil windings using automatic machines. The disclosed embodiment is further simplified in that a primary coil comprising a single winding made from a flat ribbon insulated by shrink tubing is employed. Not only can this primary coil be produced in a simple manner, but it is also easy to assemble with the rest of the coil. In principle, the magnitude and angular error of current transformers using ferrite cup cores are considerable. However, through the use of the electronic error compensation of the present invention, they can be made smaller than those of conventional high cost current transformers.

DETAILED DESCRIPTION OF THE PREFERRED EMBODIMENT

Figure 1:
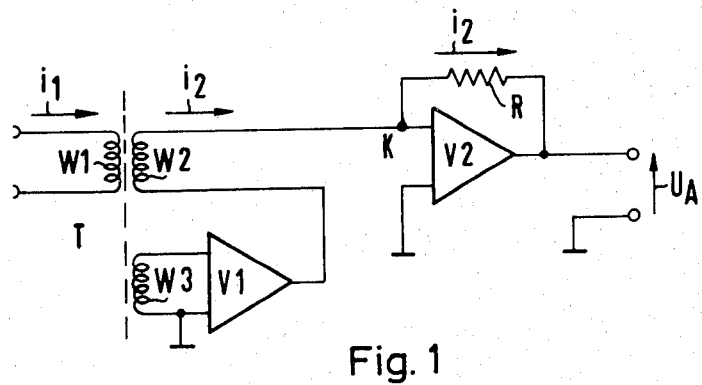
FIG. 1 is a circuit diagram illustrating a simple embodiment of the present invention.

FIG. 1 illustrates a simplified embodiment of the present invention. It basically shows two elements, a current comparator T and an operational amplifier V2. The current comparator T includes a primary winding W1, a secondary winding W2 and a sensing winding W3 along with an operational amplifier V1. The current comparator T compares the flux through the coils W1 and W2. The voltage at the sensing winding W3 is an indication of the comparators transmission error. Amplifier V1 which has the output of the sensing winding W3 as its input amplifies this voltage and provides it to the coil W2 which is connected in series therewith. As a result, it reduces the transmission error by its gain factor.

The winding W2 is directly coupled to the input of another operational amplifier V2 which can form part of the electronic measuring instrument, i.e., a measuring instrument such as that in the above noted German patent. The output of amplifier V2 is fed back to its inverting input through a feedback resistor R. The output voltage $U_A$ is taken from the output of the operational amplifier V2 with respect to ground. If the gain of amplifier V2 is assumed to be infinite, then the current node K at the input to the amplifier will have an input resistance with respect to ground $R_E = O$ for the secondary current $i_2$. Thus, no additional load energy need be supplied for the operational amplifier V2. Since the input current to the operational amplifier V2 can be neglected, the output voltage $U_A$ can be expressed as follows:

$$U_A = -i_2 \times R. \tag{1}$$

If the gain of the operational amplifier V1 is also assumed to be infinite, the operational amplifier V1 supplies the entire load power for the secondary winding of W2. As a result, the flux in the comparator becomes zero, and the secondary current becomes $$i_2 = i_1 \frac{W_1}{W_2} \tag{2}$$

exactly: Substituting equation (2) into equation (1) gives the following:

$$U_A = i_1 \frac{W_1}{W_2} R. \qquad (3)$$

Thus, the transmission errors of the illustrated arrangement depends only on the quality of the amplifiers and the secondary effects in the current comparator such as winding capacities. However, these influences are insignificant at frequencies below 100 Hz.

Figure 2:
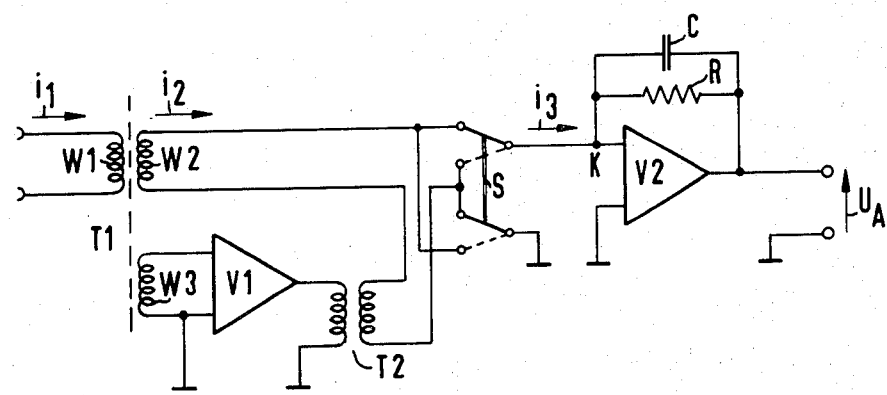
FIG. 2 is a circuit diagram of a second embodiment in which the input quantity is supplied to a operational amplifier through a switch.

In well known fashion, if capacitors substituted for the resistor R, the amplifier V2 will become an integrator without changing the measuring error of the arrangement. In some measuring instruments, it is necessary to change the polarity of the secondary current $i_2$. Such is the case, for example, where during multiplication of electrical quantities by the time division principle, a voltage-controlled pulse width-interval width modulator controls through a selector switch S, the polarity of a quantity proportional to the current so that the mean value of this signal over a period of time is proportional to the product of voltage and current. Where such a requirement exists, the arrangement of FIG. 2 may be used. In that arrangement, the operational amplifier V2 forms part of a current to frequency converter. The non-inverting input of the amplifier V2 is referenced to ground. In order to handle the types of quantities involved, the output of the current comparator designated T1 must be floating. In the arrangement of FIG. 2, such is accomplished through the use of a transformer T2 having a primary winding grounded on one side and with its other side coupled to the output of amplifier V1. The secondary of transformer T2 is coupled in series with the winding W2. The double-pole double-throw switch S permits changing the polarity of the input to the non-inverting terminal K of the amplifier V2. Although shown as a mechanical switch, this will typically be an arrangement made up of semiconductor switches preferably FET switches. In such a case, the operational amplifier must supply the additional power for overcoming the forward resistance of these switches. Amplifier V1 will automatically correct any change in forward resistance. Where the switch S is switched over at a high frequency, the output voltage $U_A$ of the operational amplifier V2 needs to be smoothed. This can be done using an RC member. In the arrangement shown by FIG. 2, this RC member is placed in the feedback path of the amplifier V2.

Figure 3:
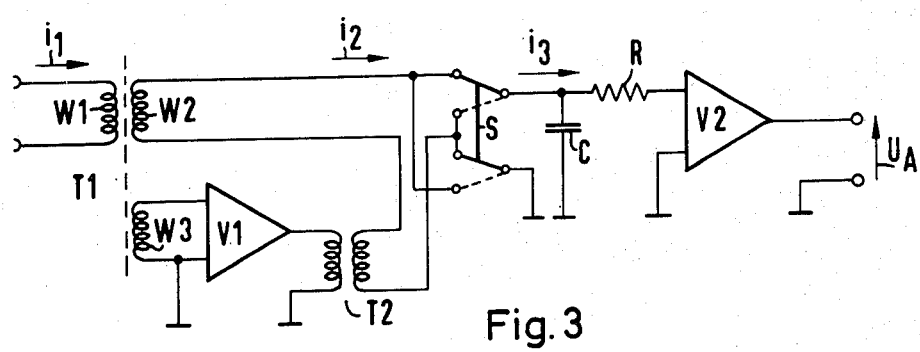
FIG. 3 is a further embodiment of the present invention.

An alternate embodiment in which smoothing through an RC circuit comprising resistor R and capacitor C is obtained at the input to amplifier V2 is shown on FIG. 3. In this arrangement, the loss at resistor R must also be made up for by the operational amplifier V1. It should be noted that the output currents of several current comparators could be summed at a current node K such as the current node K of the embodiments of FIGS. 1 and 2 without causing any additional error.

Figure 4:
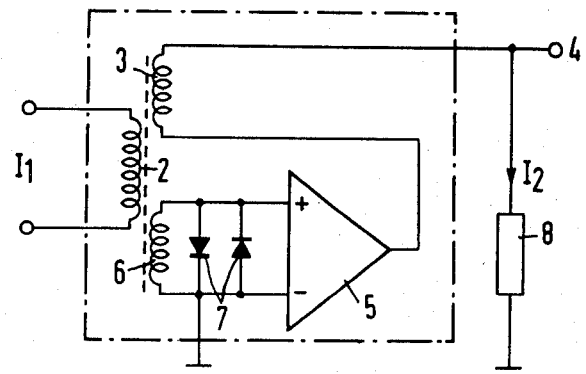
FIG. 4 is a schematic diagram of an electronic error compensated current transformer.

As will be more fully described below, a current transformer for use in the present invention can be constructed having a primary winding 2 which is in the form of an insulated flat ribbon. In this transformer, one end of the secondary winding designated 3 on FIG. 4 is connected to a terminal 4 which, as illustrated above can be the input circuit of a further operational amplifier associated with a measuring instrument. The other end of the secondary winding as connected to the output of a operational amplifier 5 whose inputs are connected across the sensing winding 6. As will be described below, coils 3 and 6 are both wound on the same coil form. In the embodiment illustrated by FIG. 4, diodes are provided across the input for limiting purposes. In aaddition, a load resistor 8 is shown across the output at terminal 4 and ground. This then is the essential element of the present invention. It is no longer simply a current transformer but is now a current comparator. If flux is present in the transformer core, a voltage appears both in the secondary winding 3 and the sensing winding 6. The voltage on the sensing winding 6 is amplified by the amplifier 5 and results in an additional current in the secondary winding 3 which reduces the flux in the transformer core to zero. As soon as the voltage in the indicator winding 6 is zero, exact ampere turn equilibrium prevails in the transformer with the transformer's transmission ratio then, correspondingly, relates very accurately to the turn ratio between the secondary winding 3 and the primary winding 2. Since all energy for feeding the secondary transformer circuit is supplied by the amplifier 5 which is provided with an auxiliary voltage source, the magnitude and angular error can be kept to any required low level.

Figure 5:
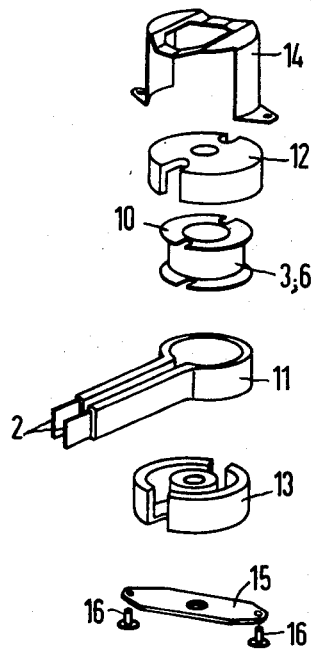
FIG. 5 is a perspective exploded view of a current transformer having a ferrite cup core which may be used in the present invention.

FIG. 5 is an exploded view of the components of a particularly simple transformer which can be used with the present invention. The secondary winding 3 is wound on a coil form 10 and along with it, the sensing coil 6. These windings can be made as simple coil windings using a coil winding machine. There is no problem with insulation. On top of these two coils, the primary winding 2 comprising one turn and produced from a flat ribbon insulated by shrunk-on tubing 11 is placed. Clearly the production and insulation of the primary coil is extremely simple. This arrangement is then held in place between two cup cores 12 and 13 with the coil form 10 and windings 2, 3 and 6 inserted therein. The two cup cores 12 and 13 are then held together by a spring clip 14 fastened to a base plate 15 with two tubular rivets 16.

Thus, an improved arrangement for measuring electrical alternating current quantities has been shown. Although specific embodiments have been illustrated and described, it will be obvious to those skilled in the art, that various modifications may be made without departing from the spirit of the invention which is intended to be limited solely by the appended claims.

What is claimed is:

1. In an apparatus for the measurement of electrical alternating current, circuit means for isolating the electrical circuit containing the alternating current to be measured from the current measurement apparatus, said means comprising:

a first current transformer including a primary winding, a secondary winding, and a sensing winding, said primary winding being coupled in series in said electrical circuit containing said alternating current to be measured;

a first operational amplifier, coupled in series between said sensing and secondary windings, having the input terminals thereof coupled to said sensing winding and the output terminal thereof coupled to said secondary winding; and a second operational amplifier, coupled to said secondary winding, for generating an output voltage signal which is proportional to the alternating current measured.

2. In the apparatus recited in claim 1, said means further comprising:
- a second current transformer including a primary winding coupled to the output terminal of said first operational amplifier and a secondary winding coupled to said secondary winding of said first current transformer;
- switching means, coupled to said secondary windings of said first and second current transformers, and to said second operational amplifier, for reversing the polarity of the input signals transmitted to said second amplifier from said secondary windings; and
- RC circuit means, coupled to the input terminal of said second operational amplifier, for smoothing said output voltage signal generated by said second operational amplifier.

3. In the apparatus recited in claim 2, said RC circuit means comprising a capacitor and resistor coupled in parallel relationship in the feedback path of said second amplifier.

4. In the apparatus recited in claim 2, said RC circuit means comprising a capacitor coupled to the input terminal of said second amplifier in parallel relationship therewith and a resistor coupled in series between said capacitor and the input terminal of said second amplifier.

5. In the apparatus recited in claim 1, said first current transformer including a ferrite cup core.

6. In the apparatus recited in claim 5, said primary winding of said first current transformer comprising one turn of flat copper ribbon insulated by shrink-tubing.

* * * * *

UNITED STATES PATENT AND TRADEMARK OFFICE
CERTIFICATE OF CORRECTION

PATENT NO. : 3 916 310
DATED : October 28, 1975
INVENTOR(S) : Reinhard Stark et al It is certified that error appears in the above-identified patent and that said Letters Patent are hereby corrected as shown below:

In column 2, line 66 add --exactly:-- before formula and delete "exactly:" in column 3, line 1

Signed and Sealed this twenty-third Day of March 1976

[SEAL]

Attest:

RUTH C. MASON
*Attesting Officer*

C. MARSHALL DANN
*Commissioner of Patents and Trademarks*